(12) United States Patent
Zhu (10) Patent No.: US 6,332,037 B1
(45) Date of Patent: Dec. 18, 2001

(54) INVARIANT, EIGENVALUE BASED, NON-DEGENERATE DATA STRUCTURE CHARACTERIZATION, STORAGE AND RETRIEVAL INDEXING METHOD

(75) Inventor: Qiuming Zhu, Omaha, NE (US)

(73) Assignee: Board of Regents of the University of Nebraska, Lincoln, NE (US)

( * ) Notice: Subject to any disclaimer, the term of this patent is extended or adjusted under 35 U.S.C. 154(b) by 0 days.

(21) Appl. No.: 09/287,961

(22) Filed: Apr. 9, 1999

(51) Int. Cl.[7] .................................................. G06K 9/34
(52) U.S. Cl. ............................................. 382/173; 382/305
(58) Field of Search .................................. 382/305, 190, 382/224, 225, 173, 174, 220, 276, 277, 289, 295, 296; 707/2, 100; 348/286; 345/418, 427

(56) References Cited

U.S. PATENT DOCUMENTS

| | | | |
|---|---|---|---|
| 4,742,558 | 5/1988 | Ishibushi et al. ........................ 382/56 |
| 5,572,726 | 11/1996 | Hasuo ................................... 395/616 |
| 5,586,197 | 12/1996 | Tsujimura et al. .................... 382/162 |
| 5,608,862 | 3/1997 | Enokida ................................ 395/501 |
| 5,644,765 | 7/1997 | Shimura et al. ...................... 395/615 |
| 5,841,891 | 11/1998 | Windig et al. ........................ 382/131 |
| 5,892,732 | * 4/1999 | Gersztenkorn ........................ 367/72 |
| 5,901,244 | * 5/1999 | Souma et al. ........................ 382/190 |
| 5,969,524 | * 10/1999 | Pierpaoli et al. ..................... 324/307 |
| 6,049,623 | * 4/2000 | Fuderer et al. ....................... 382/131 |
| 6,134,541 | * 10/2000 | Castelli et al. ............................ 707/2 |
| 6,154,746 | * 11/2000 | Berchtold et al. .................... 707/100 |
| 6,178,261 | * 1/2001 | Williams et al. ..................... 382/190 |

* cited by examiner

Primary Examiner—Leo Boudreau
Assistant Examiner—Kanji Patel
(74) Attorney, Agent, or Firm—James D. Welch (57) ABSTRACT

Disclosed is a method for enabling easy characterization, storage and retrieval of multi-dimensional data structures involving use of a translation, rotation and scaling invariant index which results from concatenating a series of Eigenvalue calculation mediated index elements determined at a plurality of hierarchical data depth levels.

19 Claims, 2 Drawing Sheets

Determining Eigenvalues for an (N) dimensional data set, said Eigenvalues being a major axis and (N-1) minor axes of a characteristic virtual data set mathematical object, then calculating a first non-degenerate data set index element using a formula which operates on said major axis and at least one of said (N-1) minor axes.

dividing said essentially entire "N" dimensional data set into at least first and second data set parts about at least one axis selected from the group consisting of: (said major axis and said (N-1) minor axes), and for at least one of said at least first and second data set parts independently determining "N" Eigenvalues therefore, said "N" Eigenvalues being a major axis and (N-1) minor axes of a mathematical object for said at least one of said at least first and second data set parts, and then calculating at least one additional non-degenerate data set index element using formula(s) which operate on said major axis and at least one of said (N-1) minor axes in said at least one of said at least first and second data set parts, and return a non-degenerate result, and concatenating at least two resulting non-degenerate data set index elements in any functional order to provide said dentifying data set index (I).

comparing said resulting data set index (I) to data image indices for data sets for which data set indicies have been previously determined.

FIG. 3

INVARIANT, EIGENVALUE BASED, NON-DEGENERATE DATA STRUCTURE CHARACTERIZATION, STORAGE AND RETRIEVAL INDEXING METHOD

TECHNICAL FIELD

The present invention relates generally to methods of data characterization, storage and retrieval, and more particularly is a method which enables easy characterization, storage and retrieval of multi-dimensional data structures, comprising use of a translation, rotation and scaling invariant index which results from concatenating a series of Eigenvalue calculation mediated index elements, determined at a plurality of hierarchical data depth levels.

BACKGROUND

Data structures, such as two dimensional pixel arrays, are being generated at an ever increasing rate. For instance, algorithm generated and scanned computer screen images, X-ray, CT, MRI and NASA satellite, space telescope and solar explorer systems generate thousands of images every day. To make optimum use of said images, however, convenient methods of data characterization, storage and retrieval are required. For example, a medical doctor might obtain an X-ray image of a patient's chest but has to rely on "diagnostic art" to arrive at a diagnosis. Were it possible to determine an index which characterizes said X-ray image and also enable easy storage and retrieval thereof, it would be possible to compare said index to a catalog of indices of various X-ray images which are known to be associated with various healthy or pathologic conditions. Thus diagnosis could be moved toward the very desirable goal of being objectively definite in a mathematical sense.

Continuing, it must be understood that conventional data bases are stored as text with organization being in terms of fields and values. Examples are business product, customer lists, sales data etc. To retrieve such data a user must issue a query in text format, similar to what is done in natural languages. It is essentially impossible to use such an approach to store and retrieve the contents of most data images, for example, because there is no convenient manageable way to describe such data images in terms of said fields and values. Data Images are instead typically stored in the form of compressed digital files of hundreds of thousands of binary numbers, and said storage technique does not facilitate easy image characterization, storage and retrieval. And, while it is possible to describe a data image with a text Index, to examine the data image data still requires that the data associated with said Index be retrieved. It is also possible to assign an arbitrary serial number to a data image to facilitate data storage and retrieval, but under this approach the serial number provides no insight to the image and again, to examine data image, requires accessing the image data per se.

A preferred approach to the characterization of data images, which provides an index for use in storage and retrieval thereof, is to base the index on features in the data image. To arrive at such an index, however, is typically computationally complex, requiring hundreds of thousands of calculations. That is, determination of said index must typically be extracted from a data image "off-line". Characteristic indices so determined are called "image indices", and ideally render a concise description, not only of an image color and intensity content on a row and column basis, but also of the nature and shape of objects therein. A problem arises, however, in that many image features can not be easily described. Geometric shapes in a data image, for example, can require a combination of text annotation and numeric values and often the result is not at all concise.

Relevant considerations in developing an approach to extracting "image indices" from a data image or data set include:

1. Uniqueness—different images/sets should have different associated image indices, (ie. an image index should be non-degenerate);
2. Universality—image/set indices must be extractable from essentially any kind of image to be characterized, stored and retrieved by use thereof;
3. Computation—image/set indices must be easily computed from any data image to be characterized, stored and retrieved by use thereof;
4. Conciseness—image/set indices must concise and easy to store;
5. Invariance—descriptive features in a data image/set must tolerate change of scale, rotation and translation transformations, image object position shifting, calibration of color and pixel intensity and return essentially unchanged image indices;
6. Noise resistant—random noise entry to image/set data should not significantly change the image index extracted therefrom.

Previous attempts at extracting an image index for image/set data have focused on use of:

pixel intensity and color distributions, (see an article titled "Query By Image And Video Content: The QBIC System)", IEEE Trans. on Computers, (Sep. 1995));

pixel texture patterns (see a book titled "Digital Image Processing", Gonzales, Addison-Wesley Pub. (1992)); and edge and boundary-line shapes, (see a book titled "Digital Image Processing And Computer Vision", Schalkoff, John Wiley & Sons, (1989)), etc. as the basis of approach. These techniques are mainly based on the calculation of the statistics of a data image in a pixel arrangement. Said techniques often lack Universality in that they work when applied to a certain type of data image, but not when applied to other types of data images. Moreover, many previous approaches are not image transformation invariant and do not tolerate entry of noise.

Continuing, one approach which provides a rotationally invariant result is termed "Equal Angular Sampling". Said method provides a concatenation of numbers which are distances from a centroid in a data image to an intersection point with an object boundary. Said technique encounters problems, however, where objects with irregular shapes, with concave boundaries and/or wherein holes are encountered.

The use of Moment Invariants to describe the geometrical shape features of data images was proposed more than thirty (30) years ago by Hu in an article titled "Visual Pattern Recognition By Moment Invariants", IRE Trans. on Information Theory, IT-8, (February 1963). The method is based in modeling an image as a physical object with masses distributed in two dimensional space. It typically treats the pixel intensities as the probability distribution value of the object masses. The central moments in various orders are calculated on distributions. A set of moment invariants is derived from making algebraic combinations of the moments. The most important property of he technique is that the resulting descriptive quantities are transformation invariant, (ie. the moment invariants remain unchanged when the image undergoes scaling, rotation, translation, intensity, or color platter changes). See an article titled "Recognitive Aspects Of Moment Invariants", by Abu-Mostafa et al., IEEE Trans. on Pattent Analysis and Mach Intell., Vol. PAMI-6, No. 6, (November 1984).

Additional references of interest are:

"Image Analysis Via the General Theory Of Moments", Teague, J. Opt. Soc. America, Vol. 70, No. 8, (Aug. 1980), which discloses that a 2D shape obtained from moment invariants defined on the second central moments can be viewed as an elliptic approximation of the shape; and "A Transformation-Invariant Recursive Subdivision Method For Shape Analysis", Zhu and Poh, IEEE Proc. of the 9th Int. Conf. on Pattern Recog., Rome, Italy, (Nov. 14–17, 1988).

Continuing, it is to be appreciated that Statistical and Moment-based descriptions of data can distinguish data images at only very rough levels. That is, an image index associated with a data image is not unique and could be arrived at by analysis of an alternative data image. In addition, the computations involved in practicing said Statistics and Moment-based approaches can be complicated and time consuming and can require both character and numeric symbols in a resultant image index. And the use of the moment invariant approach can involve the computation of an image index in high orders.

With the present invention in mind a Search of Patents was performed, with the result being that very little was found. A Patent to Windig, U.S. Pat. No. 5,841,891 is disclosed, however, as it identifes the calculation of Eigenvalues, but in a method for enhancing images. A Patent to Shimura et al., U.S. Pat. No. 5,644,756 is also identified as it describes generating calculated feature data for identifying images, with application in image identification. A Patent, U.S. Pat. No. 5,608,862 to Enokida is disclosed as it describes development of a tag which indicates the length of data in hierarchically coded image data. U.S. Pat. No. 5,572,726 to Hasuo is disclosed as it describes an index image for use in retrieval of data. A Patent to Tsujumura et al., U.S. Pat. No. 5,586,197 is disclosed as it describes using color as a basis of searching for a data image in an image database. Finally, a U.S. Pat. No. 4,742,558 to Ishibashi et al. is disclosed use of a hierarchical structure for use in image retrieval and display.

Even in view of the prior art there remains need for a convenient method of characterizing data images, and multidimensional data sets, so that they can be easily stored and retrieved. Said method should provide an index which demonstrates Uniqueness, Universality, Computational Ease, Conciseness, Invariance to data image change of scale, rotation and translation of data image object, position shifting, linear calibration of color and pixel intensity, and Resistance to random noise. In answer, the present invention provides a method of extracting a data index from an image or data set, which data index is comprised of a concatenation of Eigenvalue calculation mediated index elements determined at a plurality of hierarchical depth data levels.

DISCLOSURE OF THE INVENTION

The Present Invention has as its focus the producing of an Index (I) which is Non-Degenerately, (ie. Uniquely in that each Index describes "One Image" at some Hierarchical Level), descriptive of a Multiple, (eg. Two), Dimensional Data Image (MDDI), which Index (I) is Image Rotation, Translation, Scaling, and Intensity, Color etc. invariant. (It is noted that Intensity and Color of, for instance, a Digital Data Image are typically combined to form a single value at each Pixel (x, y) location which is a function f(x,y), by for instance, a formula that has as input variables "amounts" of Red, Green and Blue content as well as Intensity for each Pixel).

The present invention procedure involves finding, at each of a number of Hierarchical depth levels, Eigenvalues, which Eigenvalues can each be thought of as the Major ($\lambda_1$) and Minor ($\lambda_2$) Axes of a "Characteristic Virtual Ellipse" which represents said Hierarchical depth level. (The term "Virtual" indicates that the Ellipse is not usually actually drawn, but rather can be helpfully visualized as descriptive of the geometry of the Data).

At the First Hierarchical Level, the Image as a whole is considered and subjected to Mathematical Techniques, which lead to determination of $\lambda_{11}+\lambda_{21}$, which $\lambda_{11}+\lambda_{21}$ are the major and minor axes of the Characteristic Virtual Ellipse. The Non-degenerate Index Component, (which is a functional focus of the present invention as applied in the context of the Eigenvalues), for said First Level is then calculated from an equation which returns a Non-Degenerate result, such as:

$$I_1 = \frac{(\lambda_{11} - \lambda_{21})^2}{\lambda_{11} + \lambda_{21}}$$

Next, the Characteristic Virtual Ellipse Minor Axis Eigenvalue is typically considered as a dividing line between two "Sides" of the Data Image as a whole, and the data on each side thereof is considered separately, at what is the Second Hierarchical Data Depth Level, of the Procedure. For each of said two (2) "Sides" additional Eigenvalues, which are major and minor axes of characteristic virtual ellipses, are calculated and for each of said two (2) "Sides", and Non-degenerate Index Components for said Second Level are then calculated from Non-Degenerate returning Equations, such as:

$$I_2 = \frac{(\lambda_{12} - \lambda_{22})^2}{\lambda_{12} + \lambda_{22}}; \quad +I_3 = \frac{(\lambda_{13} - \lambda_{23})^2}{\lambda_{13} + \lambda_{23}}$$

An updated Non-Degenerate Index is formed by concatenation of the Three Index Components so far found, (ie. (I1) from the First Level Data (L1) Image as a whole plus two (I2 and I3) from the Second level (L2)):

I=I$_1$I$_2$I$_3$, (or any combination or permutation thereof).

Next, Data in each "Side" identified at the Second Level (L2) is divided, typically around the Minor Characteristic Virtual Ellipse Axis thereby providing a Third Level with Four (4) Separate Sets of Data. Each of said Separate Sets of Data is then subjected to similar Mathematical Treatment to the end that Four additional Non-Degenerate Index Components (I4, I5, I6 and I7), are derived, and concatenated onto or with the Three Non-Degenerate Index Components (I1, I2 and I3) already present to provide a string of Seven Non-Degenerate Index Components comprising (I1, I2, I3, I4, I5, I6 and I7) in some functional order.

The above procedure can be carried forward to as many Hierarchical Depth Levels as desired to provide a Non-Degenerate Index of a desired length and level of accuracy, even down to where a single Pixel distinguishes the Image defined by a produced Index (I). (Note —known techniques identify Pixel Color and Brightness content and perhaps some shape content, but do not do so in a manner which is Image Rotation, Translation, Scaling, and Intensity, Color etc. invariant). At this point, educated reflection should result in realization that Linear Rotation or Translation or Scaling of a Data Image will not change Non-degenerate Index (I) element values produced by practice of the Present Invention, as the underlying Eigenvalues will not change. Similarly, if the same linear change is made to Intensity at all Pixels in an Image, no change will occur in calculated Non-degenerate Index element values.

It is also to be understood that while the above specifies the minor axis $\lambda_2$ of the characteristic virtual ellipse as a data dividing locus at each hierarchical data depth level after the first, it is possible to use the major axis $\lambda_1$. In addition, it is possible to use both the major and minor axes as data dividing loci and, for instance, at the second data depth level add four additional Index Elements. The third data depth level would then add sixteen additional Index Elements and so on.

In light of the foregoing, a number of variations of the present invention method are recited directly.

A very general present invention method of providing an identifying data set index (I) for an "N" dimensional data set consisting of a multiplicity of pixels, comprises the steps of:

a. determining Eigenvalues for essentially the entire data set, said Eigenvalues being a major axis and (N−1) minor axes of a characteristic virtual data set mathematical object, then calculating a first non-degenerate data set index element using a formula which operates on said major axis and at least one of said (N−1) minor axes;

b. dividing said essentially entire "N" dimensional data set into at least first and second data set parts about at least one axis selected from the group consisting of: (said major axis and said (N−1) minor axes), and for at least one of said at least first and second data set parts independently determining "N" Eigenvalues therefore, said "N" Eigenvalues being a major axis and (N−1) minor axes of a mathematical object for said at least one of said at least first and second data set parts, and then calculating at least one additional non-degenerate data set index element using formula(s) which operate on said major axis and at least one of said (N−1) minor axes in said at least one of said at least first and second data set parts, and return a non-degenerate result; and c. concatenating at least two resulting non-degenerate data set index elements in any functional order to provide said identifying data set index (I).

Continuing, another recitation of a present invention method of providing an identifying data image index (I) for a two dimensional data image consisting of a multiplicity of pixels, said method comprises the steps of:

a. determining Eigenvalues for essentially the entire data image, said Elgenvalues being a major axis and a minor axis of a characteristic virtual ellipse, then calculating a first (I1) non-degenerate data image index element using a formula which operates on said major and minor axes Eigenvalues;

b. dividing said essentially entire two dimensional data image into at least first and second data image parts about an axis selected from the group consisting of: (said minor axis and said major axis), and for each of said at least first and second data image parts independently determining Eigenvalues therefore, said Eigenvalues being a major axis and a minor axis for a first of said separate characteristic virtual ellipses, and major axis and a minor axis for a second of said separate characteristic virtual ellipses, and optionally independently determining a major axis and a minor axis for at least some of any additional data image parts, and then calculating at least second (I2) and/or third (I3) non-degenerate data image index elements determined from two of said at least two data image parts, using formulas which return a non-degenerate result;

c. concatenating at least two of said first (I1), second (I2) and/or third (I3) non-degenerate data image index elements in any functional order to provide said identifying data image index (I).

Continuing, a more focused present invention method of providing an identifying data image index (I) for a two dimensional data image consisting of a multiplicity of pixels, comprises the steps of:

a. determining Eigenvalues for essentially the entire data image, said Eigenvalues being a major axis ($\lambda_{11}$) and a minor axis $\lambda_{21}$) of a characteristic virtual ellipse, then calculating a first (I1) non-degenerate data image index element using the formula:

$$I_1 = \frac{(\lambda_{11} - \lambda_{21})^2}{\lambda_{11} + \lambda_{21}}$$

b. dividing said essentially entire two dimensional data image into first and second data image parts about an axis selected from the group consisting of: (said minor axis and said major axis), and for each of said first and second data image parts independently determining Eigenvalues therefore, said Eigenvalues being a major axis $\lambda_{12}$ and a minor axis ($\lambda_{22}$) for the first of said separate characteristic virtual ellipses, and major axis ($\lambda_{13}$) and a minor axis ($\lambda_{23}$) for the second of said separate characteristic virtual ellipses, and then calculating second (I2) and third (I3) non-degenerate data image index elements using the formulas:

$$I_2 = \frac{(\lambda_{12} - \lambda_{22})^2}{\lambda_{12} + \lambda_{22}}; \quad +I_3 = \frac{(\lambda_{13} - \lambda_{23})^2}{\lambda_{13} + \lambda_{23}}$$

c. concatenating said first, second and third non-degenerate data image index elements to provide said identifying data image index (I) by a selection from the group consisting of:

I=I1 I2 I3;
I=I1 I3 I2;
I=I2 I1 I3;
I=I2 I3 I1;
I=I3 I1 I2; and
I=I3 I2 I1.

Another present invention method of providing an identifying data image index (I) for a two dimensional data image consisting of a multiplicity of pixels, comprises the steps of:

a. determining Eigenvalues for essentially the entire data image, said Eigenvalues being a major axis ($\lambda_{11}$) and a minor axis ($\lambda_{21}$) of a characteristic virtual ellipse, then calculating a first (I1) non-degenerate data image index element using the formula:

$$I_1 = \frac{(\lambda_{11} - \lambda_{21})^2}{\lambda_{11} + \lambda_{21}}$$

b. dividing said essentially entire two dimensional data image into first and second data image parts about an axis selected from the group consisting of: (said minor axis and said major axis), and for each of said first and second data image parts independently determining Eigenvalues therefore, said Eigenvalues being a major axis ($\lambda_{12}$) and a minor axis ($\lambda_{22}$) for the first of said separate characteristic virtual ellipses, and major axis ($\lambda_{13}$) and a minor axis ($\lambda_{23}$) for the second of said separate characteristic virtual ellipses, and then calculating second (I2) and third (I3) non-degenerate data image index elements using the formulas:

$$I_2 = \frac{(\lambda_{12} - \lambda_{22})^2}{\lambda_{12} + \lambda_{22}}; \quad +I_3 = \frac{(\lambda_{13} - \lambda_{23})^2}{\lambda_{13} + \lambda_{23}}$$

c. dividing said each of said first and second image parts from step b., each about an axis selected from the group consisting of: (said minor axis and said major axis thereof), to produce third, forth, fifth and sixth image parts and for at least one of said third, forth, fifth and sixth image parts independently determining Eigenvalues thereof, said determined Eigenvalues being selected from the group consisting of:
a major axis ($\lambda_{14}$) and a minor axis ($\lambda_{24}$) for the third of said separate characteristic virtual ellipses, and major axis ($\lambda_{15}$) and a minor axis ($\lambda_{25}$) for the forth of said separate characteristic virtual ellipses, a major axis ($\lambda_{16}$) and a minor axis ($\lambda_{26}$) for the fifth of said separate characteristic virtual ellipses, and major axis ($\lambda_{17}$) and a minor axis ($\lambda_{27}$) for the sixth of said separate characteristic virtual ellipses, and then calculating forth (I4), fifth (I5), sixth (I6) and seventh (I7) non-degenerate data image index elements using as appropriate the formulas:

$$I_4 = \frac{(\lambda_{14} - \lambda_{24})^2}{\lambda_{14} + \lambda_{24}}; \quad +I_5 = \frac{(\lambda_{15} - \lambda_{25})^2}{\lambda_{15} + \lambda_{25}}$$

$$I_6 = \frac{(\lambda_{16} - \lambda_{26})^2}{\lambda_{16} + \lambda_{26}}; \quad +I_7 = \frac{(\lambda_{17} - \lambda_{27})^2}{\lambda_{17} + \lambda_{27}}$$

d. concatenating said first (I1), and at least one produced non-degenerate data index element(s) selected from the group consisting of said: (second (I2), third (I3), forth (I4), fifth (I5), sixth (I6) and seventh (I7) non-degenerate data index elements), in any functional order, to provide said identifying data image index (I).

Said method of providing an identifying data image index (I) for a two dimensional data image consisting of a multiplicity of pixels can, in steps c. and d. thereof, provide that all of said first (I1), second (I2), third (I3), forth (I4), fifth (I5), sixth (I6) and seventh (I7) non-degenerate data index elements, are calculated and concatenated, in any functional order, to provide said identifying data image index (I).

Another variation on the present invention method of providing an identifying data image index (I) for a two dimensional data image consisting of a multiplicity of pixels, comprises the steps of:
a. determining Eigenvalues for essentially the entire data image, said Eigenvalues being a major axis ($\lambda_{11}$) and a minor axis ($\lambda_{21}$) of a characteristic virtual ellipse, then calculating a first (I1) non-degenerate data image index element using a formula which operates on said Eigenvalues:
b. dividing said essentially entire two dimensional data image into first, second, third and forth data image parts using said minor axis and said major axis as dividing means, said first, second, third and forth data image parts being oriented in a first, second, third and forth quadrant pattern defined by said major and minor axes, in said two dimensional data image;
c. for at least one of said first, second, third and forth data image parts independently determining Eigenvalues of a characteristic virtual ellipse therefore, said Eigenvalues being selected from the group consisting of:
a major axis ($\lambda_{12}$) and a minor axis ($\lambda_{22}$) for the first of said separate characteristic virtual ellipses, and a major axis ($\lambda_{13}$) and a minor axis ($\lambda_{23}$) for the second of said separate characteristic virtual ellipses, a major axis ($\lambda_{14}$) and a minor axis ($\lambda_{24}$) for the third of said separate characteristic virtual ellipses, and a major axis ($\lambda_{15}$) and a minor axis ($\lambda_{25}$) for the forth of said separate characteristic virtual ellipses;
d. calculating at least one additional non-degenerate data image index element using formula(s) which operates on Eigenvalues corresponding to said at least one of said first, second, third and forth data image parts determined in step. c; and
e. concatonating at least two resulting non-degenerate data index elements, in any functional order, to provide said identifying data image index (I).

In said variation on the present invention method of providing an identifying data image index (I) for a two dimensional data image consisting of a multiplicity of pixels wherein Eigenvalues for each of said first, second, third and forth data image parts are independently determined, said Eigenvalues being:
a major axis ($\lambda_{12}$) and a minor axis ($\lambda_{22}$) for the first of said separate characteristic virtual ellipses, and a major axis ($\lambda_{13}$) and a minor axis ($\lambda_{23}$) for the second of said separate characteristic virtual ellipses, a major axis ($\lambda_{14}$) and a minor axis ($\lambda_{24}$) for the third of said separate characteristic virtual ellipses, and a major axis ($\lambda_{15}$) and a minor axis ($\lambda_{25}$) for the forth of said separate characteristic virtual ellipses;
step d. involves calculating four additional non-degenerate data image index element using formula(s) which operate on Eigenvalues corresponding to said first, second, third and forth data image parts determined in step. c; and
e. concatenating said resulting five non-degenerate data index elements, in any functional order, to provide said identifying data image index (I).

Said variation on the present invention method of providing an identifying data image index (I) for a two dimensional data image consisting of a multiplicity of pixels can further comprise dividing said each of said first, second, third and forth data image parts from step b., each about at least one axis selected from the group consisting of: (said minor axis and said major axis) thereof, to identify at least two, and possibly four, new data image parts in each of said first, second, third and forth data image parts; and for at least some of the new data image parts determining Eigenvalues therefore, said Eigenvalues being a major axis and a minor axis for a characteristic virtual ellipse for said newly formed data image part(s); and concatenating at least some of the calculated non-degenerate data index elements, in any functional order, to provide said identifying data image index (I).

It is also to be appreciated that given a present invention index (I) as determined by any of the foregoing methods, it is possible to construct a data image or set by expanding each index element into a set of pixels, by an essential reversal of the recited procedural steps.

It is also noted that a the present invention comprises a method of identifying similarities in a first data set to those in a second data set. Said method comprises the steps of, for each said data set:

a. determining Eigenvalues for essentially the entire data image, said Eigenvalues being a major axis and a minor axis of a characteristic virtual ellipse, then calculating a first (I1) non-degenerate data image index element using a formula which operates on said major and minor axes Eigenvalues; and b. comparing said first (I1) non-degenerate data image index element for said first data set to that for said second data set.

Further, said method of identifying similarities in one a first data set to those in a second data set can comprise the steps of, for each said data set:

b. dividing said essentially entire two dimensional data image into at least first and second data image parts about an axis selected from the group consisting of: (said minor axis and said major axis), and for each of said at least first and second data image parts independently determining Eigenvalues therefore, said Eigenvalues being a major axis and a minor axis for a first of said separate characteristic virtual ellipses, and major axis and a minor axis for a second of said separate characteristic virtual ellipses, and optionally independently determining a major axis and a minor axis for at least some of any additional data image parts, and then calculating at least second (I2) and/or third (I3) non-degenerate data image index elements determined from two of said at least two data image parts, using formulas which return a non-degenerate result; and c. comparing at least said second (I2) non-degenerate data image index element for said first data set to that for said second data set.

Of course, the method of identifying similarities in one a first data set to those in a second data set can proceed to comparison of the third (I3) and additional non-degenerate data image index elements obtained from each of the data sets.

It is further to be understood that while the preferred present invention mathematical object utilized to model data is an ellipse which presents with major and minor axes Eigenvalues, and functional mathematical object from which can be extracted Eigenvalues can be utilized in practice of the method of the present invention, in any of its variations.

The foregoing recitation of variations on the method of the present invention which are within the scope thereof are, of course, intended to be demonstrative, and not limiting.

The present invention will be better understood by reference to the Detailed Description of this Disclosure in conjunction with the accompanying Drawings.

SUMMARY

It is therefore the primary purpose of the present invention to provide a method which enables easy characterization, storage and retrieval of multi-dimensional data structures, comprising use of a translation, rotation and scaling invariant index which results from concatenating a series of Eigenvalue calculation mediated index elements, determined at a plurality of hierarchical data depth levels.

It is another primary purpose of the present invention to provide a method which enables easy comparison of at least first and second multi-dimensional data structures, comprising use of translation, rotation and scaling invariant indicies which result from, for each of said at least first and second multi-dimensional data structures, concatenating a series of Eigenvalue calculation mediated index elements, determined at a plurality of hierarchical data depth levels.

BRIEF DESCRIPTION OF THE DRAWINGS

FIGS. 2b1 and 2b2 each show ellipse major axis and a minor axis attributable to level (L2) data in FIG. 1.

FIGS. 2c1, 2c2, 2c3 and 2c4 each show ellipse major axis and a minor axis attributable to level (L3) data in FIG. 1.

DETAILED DESCRIPTION

In the Disclosure Of The Invention Section herein it was established that the present invention method, as applied to data images and data sets, includes such as:

"determining Eigenvalues for essentially the entire data set, said Eigenvalues being a major axis and (N−1) minor axes of a characteristic virtual data set mathematical object, then calculating a first non-degenerate data set index element using a formula which operates on said major axis and at least one of said (N−1) minor axes"; or "determining Eigenvalues for essentially the entire data image, said Eigenvalues being a major axis ($\lambda_1$) and a minor axis ($\lambda_{21}$) of a characteristic virtual ellipse"; or "dividing said essentially entire two dimensional data image into first and second data image parts about an axis selected from the group consisting of: (said minor axis and said major axis), and for each of said first and second data image parts independently determining Eigenvalues therefore, said Eigenvalues being a major axis ($\lambda_{12}$) and a minor axis ($\lambda_{22}$) for the first of said separate characteristic virtual ellipses, and major axis ($\lambda_{13}$) and a minor axis ($\lambda_{23}$) for the second of said separate characteristic virtual ellipses";

but to this point, this Disclosure has provided no insight as to how said determination of Eigenvalues is accomplished. In the following a demonstrative two dimensional data image is assumed and a preferred method of determining Eigenvalues, comprising a major and a minor axis of a "data image characterizing virtual ellipse", is presented to provide further insight.

Figure 1:
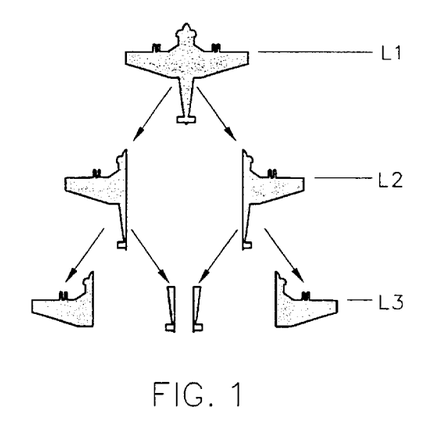
FIG. 1 shows a data image of an airplane and indicates three levels (L1), (L2) and (L3) of data image division.
Figure 2A:
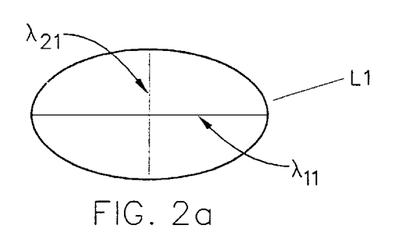
FIG. 2a shows an ellipse with a major axis and a minor axis attributable to level (L1) data in FIG. 1.
Figure 2B:
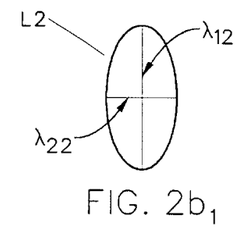
Figure 2B:
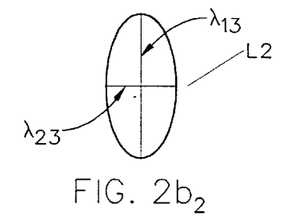
Figure 2C:
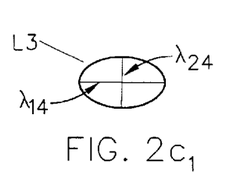
Figure 2C:
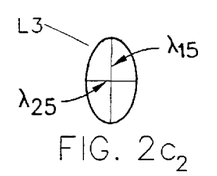
Figure 2C:
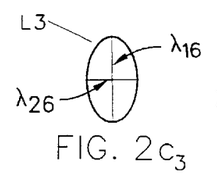
Figure 2C:
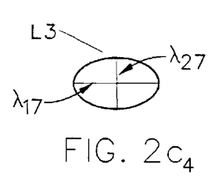

To begin, referral to FIG. 1 shows a data image of an airplane and indicates three levels (L1), (L2) and (L3) of data image division, (the reason for which will become clear supra herein). FIG. 2a shows an ellipse with a major axis ($\lambda_{11}$) and a minor axis ($\lambda_{21}$). At this point it is disclosed that the mathematical technique presented directly, operating an the image in level (L1) of FIG. 1, provides values for said FIG. 2a ellipse major axis ($\lambda_{11}$) and a minor axis ($\lambda_{21}$) Likewise application of the disclosed that the mathematical technique presented directly, independently operating on the each of the images in level (L2) of FIG. 1, provides values for said FIG. 2b1 ellipse major axis ($\lambda_{12}$) and a minor axis ($\lambda_{22}$) for said FIG. 2b2 ellipse major axis ($\lambda_{13}$) and a minor axis ($\lambda_{23}$). Likewise application of the disclosed that the mathematical technique presented directly, independently operating on the images in level (L3) of FIG. 1, provides values for said FIG. 2c1 ellipse major axis ($\lambda_{14}$) and a minor axis ($\lambda_{24}$), for said FIG. 2c2 ellipse major axis ($\lambda_{15}$) and a minor axis ($\lambda_{25}$), for said FIG. 2c3 ellipse major axis ($\lambda_{16}$)

and a minor axis ($\lambda_{26}$), for said FIG. 2c4 ellipse major axis ($\lambda_{17}$) and a minor axis ($\lambda_{27}$).

At this point it is noted that the FIG. 1 images at level (L2), are arrived at by division of the FIG. 1 image at level (L1) about the minor axis of the ellipse shown in FIG. 2a. As well, the images in the third level (L3) in FIG. 1, are arrived at by dividing the data in level (l2) therein around the minor axes in the FIGS. 2b1 and 2b2 ellipses. It is also noted at this point that practice of the method of the present invention usually does not involve actually plotting the ellipses shown in FIGS. 2a–2c4, and that is why the terminology "virtual ellipse" is often utilized in this Disclosure.

The mathematical technique involved in determining Eigenvalue major ($\lambda_{11}$) and minor ($\lambda_{21}$) axes values will be demonstrated for the FIG. 1, Level (L1), and it is to be understood that the same technique applies at levels (L2) and (L3), with the difference being that only portions of the data image are involved at said (L2) and (L3) levels.

First, the data image is considered to be a two dimensional array of pixels, each of said pixels being located by "x" and "y" position indicators, and having associated therewith a magnitude which is arrived at by application of a formula which operates on Intensity, and optionally, color content, (eg. Red, Blue and Green percentages). Now, given a two dimensional continuous function f(x,y), the moment of order (p+q) is defined, (in Chapter 7 of "Computer Image Processing and Recognition", by Hall, Academic Press), as:

$$m_{pq} = \int_{-\infty}^{\infty} \int_{-\infty}^{\infty} x^p y^q f(x,y) dx\, dy \quad p,q = 1, 2, \ldots$$

Continuing, a uniqueness theorem states that if f(x,y) is piecewise continuous and has nonzero values in a finite part of the x-y plane, then moments of all orders exist and the moment sequence $m_{pq}$ is uniquely determined by f(x,y). Conversely, $m_{pq}$ uniquely recovers f(x,y). It is noted that this condition is generally satisfied by a digital image. Now, the central moment of order (p+q) is expressed as:

$$\mu_{pq} = \int_{-\infty}^{\infty}(x-\bar{x})^p(y-\bar{y})^q f(x,y) dx\, dy$$

where:

$$\bar{x} = \frac{m_{10}}{m_{00}} \text{ and } \bar{y} = \frac{m_{01}}{m_{00}}$$

are the centroids. For a digital image the above equations become:

$$m_{pq} = \sum_x \sum_y x^p y^q f(x, y); \quad \text{for } p, q = 0, 1, 2, \ldots$$

$$\mu_{pq} = \sum_x \sum_y (x-\bar{x})^p(y-\bar{y})^q f(x, y), \quad \text{for } p, q = 0, 1, 2, \ldots$$

Further, it is known that the $\mu_{pq}$ is invariant under translation. That is:

$$\mu_{pq}(x,y) = \mu_{pq}(x-x_0, y-y_0)$$

However, $\mu_{pq}$ is scaling and rotation dependent.

The second central moments of an image function f(x,y) are moments of inertia and are analogous to variances and covariance of a bivariant probability distribution. The 2×2 matrix formed by them being:

$$\sum = \begin{bmatrix} \mu_{20} & \mu_{11} \\ \mu_{11} & \mu_{02} \end{bmatrix}$$

is real symetric. The Eigenvalues of $\Sigma$ are solutions to the characteristic equation:

$$|\Sigma - \lambda I| = 0$$

The Eigenvector $\Phi_i$ corresponding to Eigenvalue $\lambda_i$ is given by:

$$(\Sigma - \lambda_i I)\Phi_i = 0$$

Since $\Sigma$ is real symetric, the Eigenvectors corresponding to two different Eigenvalues are orthogonal. The Eigenvalues of the above central moments are invariant under rotation of the image function f(x,y), but are still scaling dependent. One way to make them scaling invariant is by normalization, such as:

$$\frac{\lambda_1}{\lambda_2'}$$

or taking the ratio:

$$\lambda_1/\lambda_2$$

Another way is to use the normalized second central moments denoted as $\eta_{pq}$;

$$\eta_{pq} = \frac{\mu_{pq}}{\mu_{00}^r} \quad \text{where } r = \frac{(p+q)}{2} + 1; \quad \text{for } p+q = 2, 3, \ldots$$

Said Eigenvalues and Eigenvectors have important properties:

1. The Eigenvalue matrix $\Lambda$ is invariant under orthogonal linear transformations; and
2. The Eigenvector corresponding to the largest Eigenvalue points to the direction with the largest changes of the object image, ie. the longest cross expansion of the 2D shape.

Therefore an Eigenvector of the second central moments passing through the centroid of f(x,y) gives a unique partition or the object image. The resulting subdivisions are independent of the position, scaling and orientation changes of the objects in the image. It is noted that by use of a 3×3 normalized second central moment matrix the described scheme application can be expanded to a 3D data set.

It is to be appreciated that Eigenvalues derived from normalized second central moments:

$$\lambda_1 = \tfrac{1}{2}((\eta_{20}+\eta_{02})+\sqrt{(\eta_{20}-\eta_{02})^2 + 4\eta_{11}^2})$$

$$\lambda_2 = \tfrac{1}{2}((\eta_{20}+\eta_{02})-\sqrt{(\eta_{20}-\eta_{02})^2 + 4\eta_{11}^2})$$

are invariant under geometric transformations of the image function f(x,y). Further, the description of a 2D shape by moment invariants defined on the second central moments can be viewed as an elliptic approximation of the shape, as described in "Image Analysis Via the General Theory Of Moments", Teague, J. Opt. Soc. America, Vol. 70, No. 8, (August 1980). That is, for an image defined by $$f(x, y) = \begin{cases} 1, & \frac{x^2}{a^2} + \frac{y^2}{b^2} \le 1; \\ 0, & \text{otherwise} \end{cases}$$

the Eigenvalues:

$$\lambda_1 = \frac{1}{a^2} \qquad \lambda_2 = \frac{1}{b^2}$$

are the major ($\lambda_1$) and minor ($\lambda_2$) axis of the so defined ellipse. The descriptors ($\lambda_1$) and ($\lambda_2$) modulate the shape of the ellipse, and Eigenvalues of the second central moments of the image function f(x,y) uniquely determines an elliptic approximation of the object shape.

The described shape descriptors ($\lambda_1$) and ($\lambda_2$) can be acquired at various data depth levels such as demonstrated by (L1) (L2) and (L3) in FIG. 1.

The foregoing mathematical derivation is presented in "A Transformation-Invariant Recursive Subdivision Method For Shape Analysis", Zhu and Poh, IEEE Proc. of the 9th Int. Conf. on Pattern Recog., Rome, Italy, (Nov. 14–17, 1988).

Further, it is noted that in calculation of the Eigenvalues ($\lambda_1$) and ($\lambda_2$) it is possible to find:

$\bar{x} = m_{10}/m_{00}$; and $\bar{y} = m_{01}/m_{00}$;

then for p, q=0, 1, 2... determining $$u_{pq} = \sum_x \sum_y (x - \bar{x})^p (y - \bar{y})^q f(x, y), \quad \text{for } p, q = 0, 1, 2, \ldots$$

to the end that $\eta_{pq} = u_{pq}/u^y_{00}$ is calculatable, where y=(p+q)/2+1, for p+q=2, 3 . . .

followed by calculation of:

$u_{11} = m_{11} - \bar{x} m_{01}$;

$u_{20} = m_{20} - \bar{x} m_{10}$; and $u_{02} = m_{02} - \bar{y} m_{01}$ and then determine:

$\eta_{11} = u_{11}/m^2_{00}$;

$\eta_{20} = u_{20}/m^2_{00}$; and $\eta_{02} = u_{02}/m^2_{00}$;

where $m_{00} = u_{00}$;

to provide entries for calculating ($\lambda_1$) and ($\lambda_2$) by equations presented infra herein.

What is new in the present invention is use of the described shape descriptors, generally represented by ($\lambda_1$) and ($\lambda_2$), found from application of the just recited technique to various portions of the image data at various levels (L1), (L2) (L3) etc., to form a plurality of Non-degenerate Index Elements, (I1), (I2) (3) etc. which plurality of Non-degenerate Index Elements are then concatenated in a functional order to form a data image identifying Index (I) which is descriptive of the data image. It is to be appreciated that said identifying Index (I) not only characterizes a data image, but also can be easily stored and retrieved by conventional computer programming techniques.

As presented infra in this Disclosure in specific forms, a preferred, but not exclusive, general formulation for producing Non-degenerate Index Elements is:

$$I = \frac{(\lambda_1 - \lambda_2)^2}{\lambda_1 + \lambda_2}$$

The present invention then is a method for enabling easy characterization, storage and retrieval of multi-dimensional data structures involving use of a translation, rotation and scaling invariant index which results from concatenating a series of Eigenvalue calculation mediated index elements determined at a plurality of hierarchical data depth levels.

It should also be appreciated that given a sufficiently long present invention index comprised of concatenation of Eigenvalue calculation mediated index elements, it is possible to reconstruct the characterized image by a procedure which is essentially the reverse of that used to arrive at said present invention index, as recited infra herein.

It should also be appreciated that the present invention provides a convenient method for comparing the content of two or more data sets, via comparison of corresponding Non-degenerate Index Elements arrived at by practice of the described method. This is especially applicable in comparison of, for instance, medical data images corresponding to a subject and to archieved medical reference images which are, in a practical sense, unidentifiable, hence, unretrievable, in the absence of the methodology present invention.

Figure 3:
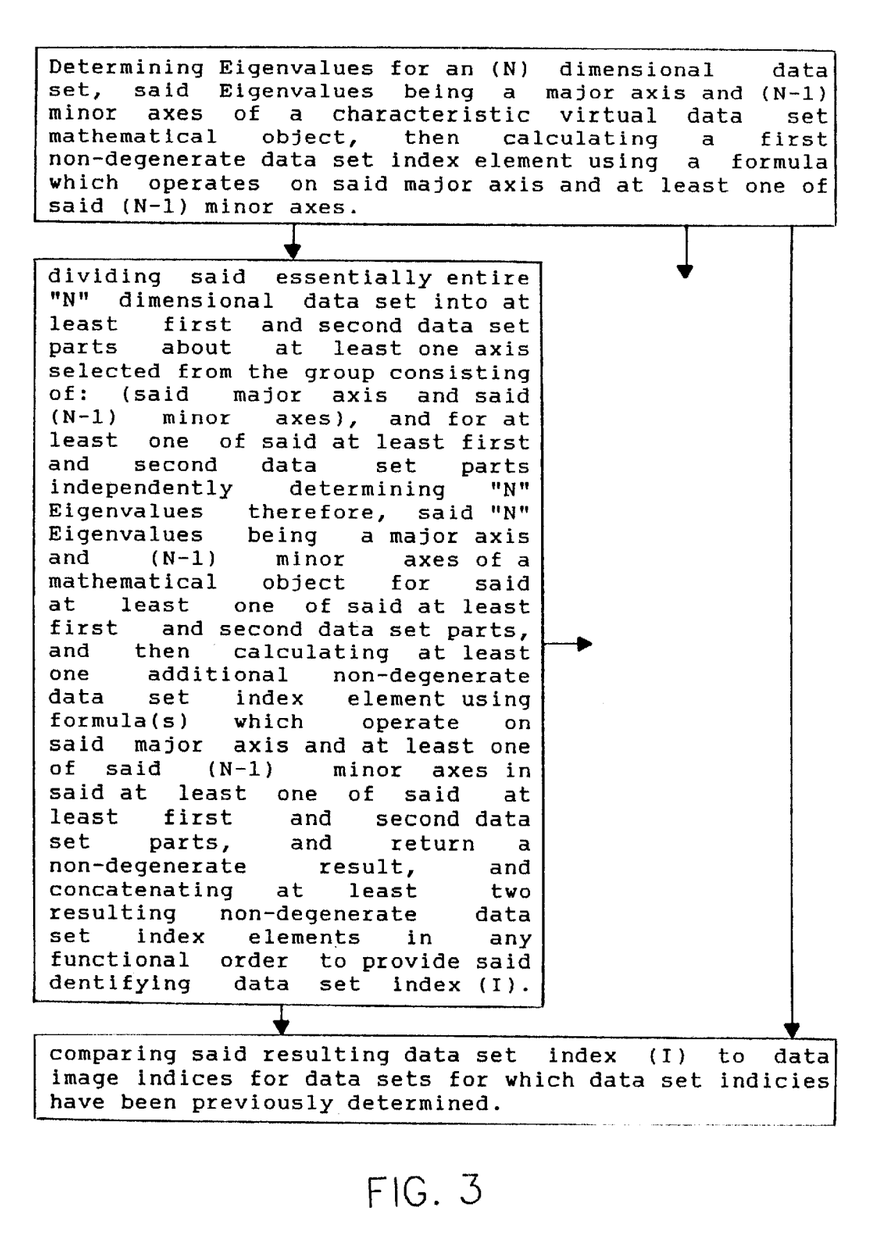
FIG. 3 demonstrates a general method of the present invention.

FIG. 3 is included to provide insight to, and demonstrate, a general method of the present invention.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the claims.

I claim:

1. A method of providing an identifying data image index (I) for a two dimensional data image consisting of a multiplicity of pixels, said method comprising the steps of:

a. determining Eigenvalues for essentially the entire data image, said Eigenvalues being a major axis ($\lambda_{11}$) and a minor axis ($\lambda_{21}$) of a characteristic virtual ellipse, then calculating a first (I1) non-degenerate data image index element using the formula:

$$I_1 = \frac{(\lambda_{11} - \lambda_{12})^2}{\lambda_{11} + \lambda_{21}};$$

b. dividing said essentially entire two dimensional data image into first and second data image parts about an axis selected from the group consisting of:
said minor axis; and
said major axis;

and for each of said first and second data image parts independently determining Eigenvalues therefore, said Eigenvalues being a major axis ($\lambda_{12}$) and a minor axis ($\lambda_{22}$) for the first of said separate characteristic virtual ellipses, and major axis ($\lambda_{13}$) and a minor axis ($\lambda_{23}$) for the second of said separate characteristic virtual ellipses, and then calculating second (I2) and third (I3) non-degenerate data image index elements using the formulas:

$$I_2 = \frac{(\lambda_{12} - \lambda_{22})^2}{\lambda_{12} + \lambda_{22}}; \text{ and}$$

$$I_3 = \frac{(\lambda_{13} - \lambda_{23})^2}{\lambda_{13} + \lambda_{23}};$$

c. concatenating said first, second and third non-degenerate data image index elements to provide said identifying data image index (I) by a selection from the group consisting of:
I=I1 I2 I3;
I=I1 I3 I2;
I=I2 I1 I3;
I=I2 I3 I1;
I=I3 I1 I2; and
I=I3 I2 I1.

2. A method of providing an identifying index (I) for a two dimensional image consisting of a multiplicity of pixels as in claim 1, in which the step of determining Eigenvalues for essentially the entire image, said Eigenvalues being a major axis ($\lambda_{11}$) and a minor axis ($\lambda_{21}$) of a characteristic virtual ellipse involves:

for a multiplicity of pixel intensities f(x,y), determining moments of order (p+q) for p, q=0, 1, 2 . . . where $$m_{pq} = \sum_x \sum_y x^p y^q f(x, y); \text{ for } p, q = 0, 1, 2, \ldots$$

to the end that $\bar{x}$=m10/m00 and $\bar{y}$=m01/m00 are calculated, then for p, q=0, 1, 2 . . . determining $$u_{pq} = \sum_x \sum_y (x - \bar{x})^p (y - \bar{y})^q f(x, y), \text{ for } p, q = 0, 1, 2, \ldots$$

to the end that $\eta_{pq}=u_{pq}/u^y{}_{00}$ is calculatable, where $y=(p+q)/2+1$, for $p+q=2, 3 \ldots$ followed by calculation of:

$u11=m11-\bar{x}m01;$ $u20=m20-\bar{x}m10;$ and $u02=m02-\bar{y}m01$ and then:

$\eta 11=u11/m^2{}_{00};$ $\eta 20=u20/m^2{}_{00};$ and $\eta 02=u02/m^2{}_{00}$ where $m_{00}=u_{00}$ followed by calculation of:

$\lambda_1=\frac{1}{2}((\eta_{20}+\eta_{02}) +\sqrt{(\eta_{20}-\eta_{02})^{2+4\eta_{11}{}^2}})$ $\lambda_2=\frac{1}{2}((\eta_{20}+\eta_{02}) -\sqrt{(\eta_{20}-\eta_{02})^{2+4\eta_{11}{}^2}}).$ 3. A method of developing an image comprising the steps of:
   a. providing an identifying two dimensional data image index (I) as determined in claim 2;
   b. converting each data index element into an array of pixels; and
   c. combining the resulting pixels.

4. A method of developing an image comprising the steps of:
   a. providing an identifying data image Index (I) as determined in claim 1;
   b. converting each data index element into an array of pixels; and
   c. combining the resulting pixels.

5. A method of providing an identifying data image index (I) for a two dimensional data image consisting of a multiplicity of pixels, said method comprising the steps of:
   a. determining Eigenvalues for essentially the entire data image, said Eigenvalues being a major axis and a minor axis of a characteristic virtual ellipse, then calculating a first (I1) non-degenerate data image index element using a formula which operates on said major and minor axes Eigenvalues.

6. A method of developing an image comprising the steps of:
   a. providing an identifying data image index (I) as determined in claim 5;
   b. converting each data index element into an array of pixels; and
   c. combining the resulting pixels.

7. A method of providing an identifying data set index (I) for an "N" dimensional data set consisting of a multiplicity of pixels, said method comprising the step of:
   a. determining Eigenvalues for essentially the entire data set, said Eigenvalues being a major axis and (N−1) minor axes of a characteristic virtual data set mathematical object, then calculating a first non-degenerate data set index element using a formula which operates on said major axis and at least one of said (N−1) minor axes
   b. dividing said essentially entire "N" dimensional data set into at least first and second data set parts about at least one axis selected from the group consisting of:
   said major axis; and
   said (N−1) minor axes;
   and for at least one of said at least first and second data set parts independently determining "N" Eigenvalues therefore, said "N" Eigenvalues being a major axis and (N−1) minor axes of a mathematical object for said at least one of said at least first and second data set parts, and then calculating at least one additional non-degenerate data set index element using formula(s) which operate on said major axis and at least one of said (N−1) minor axes in said at least one of said at least first and second data set parts, and return a non-degenerate result;
   c. concatenating at least two resulting non-degenerate data set index elements in any functional order to provide said identifying data set index (I).

8. A method of developing a data set comprising the steps of:
   a. method of providing an identifying data set index (I) as determined in claim 7;
   b. converting each data index element into a set of pixels; and
   c. combining the resulting pixels.

9. A method of providing an identifying data image index (I) for a two dimensional data image consisting of a multiplicity of pixels, comprising the steps of:
   a. determining Eigenvalues for essentially the entire data image, said Eigenvalues being a major axis ($\lambda_{11}$) and a minor axis ($\lambda_{21}$) of a characteristic virtual ellipse, then calculating a first (I1) non-degenerate data image index element using the formula:

$$I_1 = \frac{(\lambda_{11} - \lambda_{12})^2}{\lambda_{11} + \lambda_{21}};$$

b. dividing said essentially entire two dimensional data Image into first and second data image parts about an axis selected from the group consisting of:
said minor axis; and
said major axis;
and for each of said first and second data image parts independently determining Eigenvalues therefore, said Eigenvalues being a major axis ($\lambda_{12}$) and a minor axis ($\lambda_{22}$) for the first of said separate characteristic virtual ellipses, and major axis ($\lambda_{13}$) and a minor axis ($\lambda_{23}$) for the second of said separate characteristic virtual ellipses, and then calculating second (I2) and third (I3) non-degenerate data image index elements using the formulas:

$$I_2 = \frac{(\lambda_{12} - \lambda_{22})^2}{\lambda_{12} + \lambda_{22}}; \text{ and}$$

$$I_3 = \frac{(\lambda_{13} - \lambda_{23})^2}{\lambda_{13} + \lambda_{23}};$$

c. dividing said each of said first and second image parts from step b., each about an axis selected from the group consisting of:
said minor axis; and
said major axis thereof;
to produce third, forth, fifth and sixth image parts and for at least one of said third, forth, fifth and sixth image parts independently determining Eigenvalues thereof, said determined Eigenvalues being selected from the group consisting of:
a major axis ($\lambda_{14}$) and a minor axis ($\lambda_{24}$) for the third of said separate characteristic virtual ellipses, and major axis ($\lambda_{15}$) and a minor axis ($\lambda_{25}$) for the forth of said separate characteristic virtual ellipses, a major axis ($\lambda_{16}$) and a minor axis ($\lambda_{26}$) for the fifth of said separate characteristic virtual ellipses, and major axis ($\lambda_{17}$) and a minor axis ($\lambda_{27}$) for the sixth of said separate characteristic virtual ellipses, and then calculating forth (I4), fifth (I5), sixth (I6) and seventh (I7) non-degenerate data image index elements using as appropriate the formulas:

$$I_4 = \frac{(\lambda_{14} - \lambda_{24})^2}{\lambda_{14} + \lambda_{24}}; \quad I_5 = \frac{(\lambda_{15} - \lambda_{25})^2}{\lambda_{15} + \lambda_{25}};$$

$$I_6 = \frac{(\lambda_{16} - \lambda_{26})^2}{\lambda_{16} + \lambda_{26}}; \quad I_7 = \frac{(\lambda_{17} - \lambda_{27})^2}{\lambda_{17} + \lambda_{27}};$$

d. concatenating said first (I1), and at least one produced non-degenerate data index element(s) selected from the group consisting of said: (second (I2), third (I3), forth (I4), fifth (I5), sixth (I6) and seventh (I7) non-degenerate data index elements), in any functional order, to provide said identifying data image index (I).

10. A method of providing an identifying data image index (I) for a two dimensional data image consisting of a multiplicity of pixels as in claim 9, in which, in steps c. and d. thereof, all of said first (I1), second (I2), third (I3), forth (I4), fifth (I5), sixth (I6) and seventh (I7) non-degenerate data index elements, are calculated and concatenated, in any functional order, to provide said identifying data image index (I).

11. A method of developing an image comprising the steps of:
a. providing an identifying data image index (I) as determined in claim 10;
b. converting each data index element into an array of pixels; and
c. combining the resulting pixels.

12. A method of developing an image comprising the steps of:
a. providing an identifying data image index (I) as determined in claim 9;
b. converting each data index element into an array of pixels; and
c. combining the resulting pixels.

13. A method of providing an identifying data image index (I) for a two dimensional data image consisting of a multiplicity of pixels, comprising the steps of:
a. determining Eigenvalues for essentially the entire data image, said Eigenvalues being a major axis ($\lambda_{11}$) and a minor axis ($\lambda_{21}$) of a characteristic virtual ellipse, then calculating a first (I1) non-degenerate data image index element using a formula which operates on said Eigenvalues:
b. dividing said essentially entire two dimensional data image into first, second, third and forth data image parts using said minor axis and said major axis as dividing means, said first, second, third and forth data image parts being oriented in a first, second, third and forth quadrant pattern defined by said major and minor axes, in said two dimensional data image;
c. for at least one of said first, second, third and forth data image parts independently determining Eigenvalues of a characteristic virtual ellipse therefore, said Eigenvalues being selected from the group consisting of:
a major axis ($\lambda_{12}$) and a minor axis ($\lambda_{22}$) for the first of said separate characteristic virtual ellipses, and a major axis ($\lambda_{13}$) and a minor axis ($\lambda_{23}$) for the second of said separate characteristic virtual ellipses, a major axis ($\lambda_{14}$) and a minor axis ($\lambda_{24}$) for the third of said separate characteristic virtual ellipses, and a major axis ($\lambda_{15}$) and a minor axis ($\lambda_{25}$) for the forth of said separate characteristic virtual ellipses;
d. calculating at least one additional non-degenerate data image index element using formula(s) which operates on Eigenvalues corresponding to said at least one of said first, second, third and forth data image parts determined in step. c; and
e. concatenating at least two resulting non-degenerate data index elements, in any functional order, to provide said identifying data image index (I).

14. A method of providing an identifying data image index (I) for a two dimensional data image consisting of a multiplicity of pixels as in claim 13, wherein Eigenvalues for each of said first, second, third and forth data image parts are independently determined, said Eigenvalues being:
a major axis ($\lambda_{12}$) and a minor axis ($\lambda_{22}$) for the first of said separate characteristic virtual ellipses, and a major axis ($\lambda_{13}$) and a minor axis ($\lambda_{23}$) for the second of said separate characteristic virtual ellipses, a major axis ($\lambda_{14}$) and a minor axis ($\lambda_{24}$) for the third of said separate characteristic virtual ellipses, and a major axis ($\lambda_{15}$) and a minor axis ($\lambda_{25}$) for the forth of said separate characteristic virtual ellipses;
and wherein step d. involves calculating four additional non-degenerate data image index element using formula(s)

which operate on Eigenvalues corresponding to said first, second, third and forth data image parts determined in step. c; and     e. concatenating said resulting five non-degenerate data index elements, in any functional order, to provide said identifying data image index (I).

15. A method of providing an identifying data image index (I) for a two dimensional data image consisting of a multiplicity of pixels as in claim 14, which further comprises dividing said each of said first, second, third and forth data image parts from step b., each about at least one axis selected from the group consisting of: (said minor axis and said major axis) thereof, to identify at least two, and possibly four, new data image parts in each of said first, second, third and forth data image parts; and for at least some of the new data image parts determining Eigenvalues therefore, said Eigenvalues being a major axis and a minor axis for a characteristic virtual ellipse for said newly formed data image part(s); and concatonating at least some of the calculated non-degenerate data index elements, in any functional order, to provide said identifying data image index (I).

16. A method of developing an image comprising the steps of:

a. providing an identifying data image index (I) as determined in claim 15;

b. converting each data index element into an array of pixels; and     c. combining the resulting pixels.

17. A method of developing an image comprising the steps of:

a. providing an identifying data image index (I) as determined in claim 14;

b. converting each data index element into an array of pixels; and     c. combining the resulting pixels.

18. A method of developing an image comprising the steps of:

a. providing an identifying data image index (I) as determined in claim 13;

b. converting each data index element into an array of pixels; and     c. combining the resulting pixels.

19. A method of identifying similarities in a first and a second data set comprising the steps of, for each said data set:

a. determining Eigenvalues for essentially the entire data set, said Eigenvalues being at least a major axis and a minor axis of a mathematical object representation of said entire data set, then calculating a first (I1) non-degenerate data set index element using a formula which operates on said Eigenvalues; and     b. dividing said essentially entire data set into at least first and second data set parts about an axis selected from the group consisting of:

said minor axis; and said major axis;

and for at least one of the first and second data set parts independently determining Eigenvalues therefore, said Eigenvalues being at least a major axis and a minor axis for a mathematical object representation of said at least one of said first of said separate data set parts, optionally independently determining at least a major axis and a minor axis for a second mathematical object representation of said second data set part, and optionally independently determining a major axis and a minor axis for at least some of any additional data set parts, and then calculating at least second (I2) and/or third (I3) non-degenerate data image index elements determined from two of said at least two data set parts, using formulas which return a non-degenerate result; and     c. comparing said first (I1) non-degenerate data set index element for said first data set to that for said second data set; and     comparing at least one of said second (I2) and third (I3) non-degenerate data image index element for said first data set to that for said second data set.

\* \* \* \* \*